United States Patent
Bayrle et al.

(10) Patent No.: US 7,911,439 B2
(45) Date of Patent: Mar. 22, 2011

(54) LIQUID CRYSTAL DISPLAY DEVICE

(75) Inventors: Reiner Bayrle, Langenau (DE); Thomas Bitter, Bad Ditzenbach (DE); Otto Bader, Warthausen (DE)

(73) Assignee: AEG Gesellschaft für Moderne Informationssysteme mbH, Ulm (DE)

( * ) Notice: Subject to any disclaimer, the term of this patent is extended or adjusted under 35 U.S.C. 154(b) by 1248 days.

(21) Appl. No.: 11/490,609

(22) Filed: Jul. 21, 2006

(65) Prior Publication Data
US 2007/0018943 A1 Jan. 25, 2007

(30) Foreign Application Priority Data
Jul. 22, 2005 (DE) .................. 20 2005 011 574 U

(51) Int. Cl.
G09G 3/36 (2006.01)
G09G 3/28 (2006.01)
(52) U.S. Cl. .............. 345/102; 345/87; 349/61; 349/64
(58) Field of Classification Search ............ 345/87–107; 349/56, 61, 64
See application file for complete search history.

(56) References Cited

U.S. PATENT DOCUMENTS

| | | | |
|---|---|---|---|
| 5,471,331 A | 11/1995 | Takizawa et al. | |
| 2005/0007517 A1 | 1/2005 | Anandan | |
| 2006/0187378 A1* | 8/2006 | Bong et al. ..................... | 349/69 |

FOREIGN PATENT DOCUMENTS

| | | |
|---|---|---|
| DE | 199 16 747 A1 | 10/2000 |
| DE | 696 14 793 T2 | 5/2002 |
| JP | 10-197844 A | 7/1998 |
| WO | WO-97/38347 A1 | 10/1997 |
| WO | WO-2004/063309 A1 | 7/2004 |

OTHER PUBLICATIONS

Lueder, Ernst, "Liquid Crystal Displays: Addressing Schemes and Electro-Optical Effects", Willey Series in Display Technology, Wiley-Verlag, 2001, ISBN 0-471-49029-8, vgl. Kap. 6.5, pp. 121-122.

* cited by examiner

Primary Examiner — Srilakshmi K Kumar
(74) Attorney, Agent, or Firm — Morrison & Foerster LLP

(57) ABSTRACT

A liquid crystal display with improved display characteristics is disclosed. An OLED element is used as backlighting device resulting in a very flat liquid crystal display with a backlighting device. At least the front OLED drive electrode is formed such that it is at least partly light-transmissive, so that light from the OLED can be incident on the LCD element. The combination of an LCD element having internal reflectors or internal scattering elements and an OLED backlighting yields a thin overall display element which can be illuminated by sunlight during daytime and which can be illuminated using the OLED backlighting. Both the LCD element and the OLED element or OLED backlighting may represent information. For example, the actual information can be displayed on the LCD element, while the OLED element, primarily functioning as a backlighting device, can additionally represent a logo.

13 Claims, 4 Drawing Sheets

LIQUID CRYSTAL DISPLAY DEVICE

The invention relates to a liquid crystal display device.

Conventional liquid crystal displays comprising an LCD element for displaying information require a backlighting device. Said backlighting device is necessary since the liquid crystal in LCD elements is not itself luminous, but rather can only be switched between transparent and non-transparent. Such liquid crystal displays with a backlighting device are known from DE 101 08 411 A1, by way of example.

Thin film-like and flexible OLED display devices are also being used in the meantime for display elements. These OLED elements have the advantage over LCD elements that they are self-luminous, with the result that backlighting is unnecessary. Such a display element is known from WO 03/088370 A2, by way of example.

From DE 199 16 747 A1 and from WO 97/38347 a transmissive LCD element having a backlighting in the form of an OLED element is known.

It is an object of the present invention to provide a liquid crystal display with improved display characteristics.

According to an aspect of the invention an OLED element is used as backlighting device resulting in a very flat liquid crystal display with a backlighting device. In this case, at least the front OLED drive electrode is formed such that it is at least partly light-transmissive, so that light from the OLED can be incident on the LCD element. The combination of a LCD element having internal reflectors or internal scattering elements and an OLED backlighting yields a thin overall display element which can be illuminated by sunlight during daytime and which can be illuminated using the OLED backlighting.

According to a further aspect of the invention both the LCD element and the OLED element or OLED backlighting are suitable for representing information. It is thus possible, by way of example, for the actual information to be displayed on the LCD element, while the OLED element, primarily functioning as a backlighting device, can additionally represent a logo.

This possibility of representing a specific pattern in the OLED backlighting is made possible in particular by a multipartite front and/or multipartite OLED drive electrode.

One or a plurality of enhancement films may be provided in a customary manner between the OLED backlighting device in and the LCD element.

It is also possible in a customary manner for the LCD element to appear transparent or non-transparent (normally white or normally black) in the de-energized or non-driven state. Whether normally white or normally black is used depends on the specific application.

In accordance with further aspect of the invention, the back drive electrode of the OLED element is formed such that it is reflective, and in particular diffusely reflective. The transflector or reflector that is required particularly in the case of twisted nematic LCD elements is therefore obviated.

In accordance with a further aspect of the invention, a diffuser layer is arranged between the OLED element and the LCD element. Uniform illumination of the LCD element is thereby achieved. In addition, the mode of action of enhancement films is therefore improved.

In accordance with further aspect of the invention, said diffuser can be switched back and forth between transparent and diffuse over its entire area or in specific regions. Specific illumination effects can thereby be obtained. Furthermore, information, e.g. a logo, a watermark or the like, may additionally also be displayed in the diffuser layer.

Preferably an LCD element comprising a cholesteric multistable liquid crystal (CM LCD element) with internal reflectors is used. LCD elements of this type are known from WO 03/096314 A2.

In accordance with a further aspect of the invention in this case the front OLED drive electrode is formed such that it is light-transmissive in the region of the internal reflectors and light-absorbing otherwise. The OLED element or the backlighting device thus takes on the absorbing layer required in these LCD elements on the rear side outside the internal reflectors.

In accordance with a further aspect of the invention the front and/or back OLED drive electrode is provided only in the region of the internal reflectors of the CM LCD element, at least the front OLED drive electrode being transparent.

In accordance with a further aspect of the invention the back OLED drive electrode is non-transparent. In this way, light is only generated in the region of the internal reflectors and the non-transparent back OLED drive electrode absorbs light incident on the liquid crystal display device from the front.

Further details, features and advantages of the invention emerge from the following description of preferred embodiments with reference to the drawing, in which.

Figure 1:
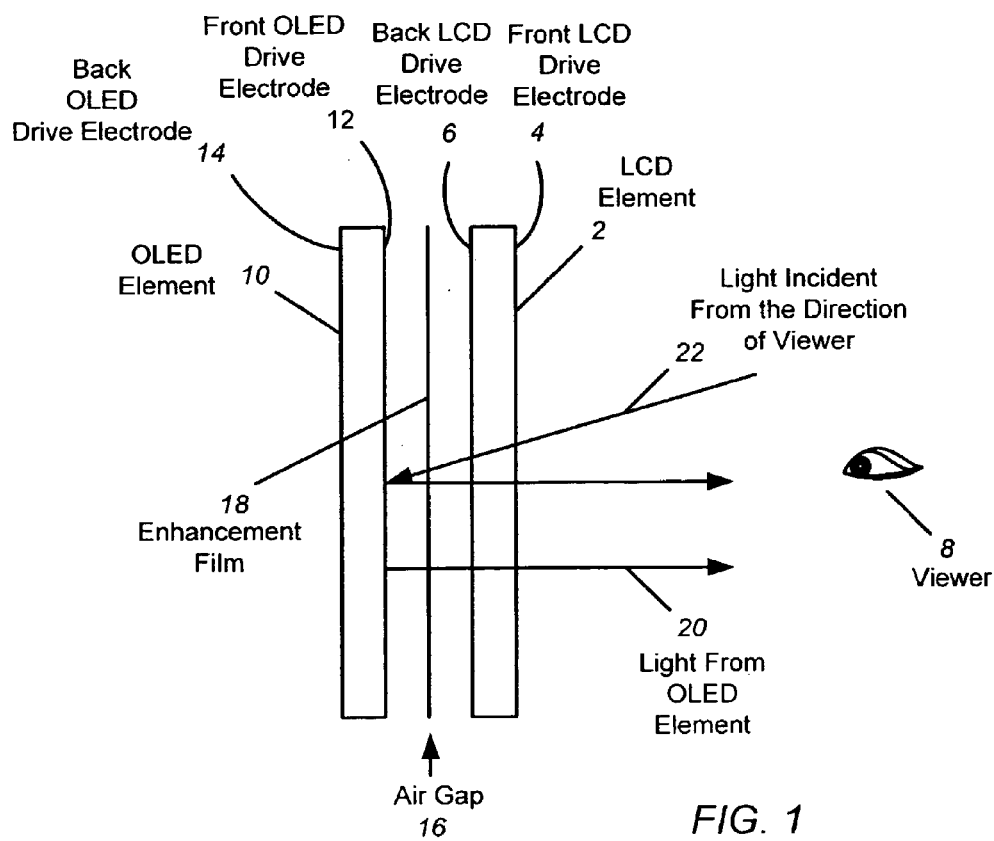
FIG. 1 shows a basic explanation of an LCD element with OLED backlighting.

FIG. 1 schematically basic structure of an LCD element with OLED backlighting with an ETN-LCD element 2 (ETN=Extended Twisted Nematic). The ETN-LCD element 2 comprises front and back drive electrodes 4 and 6. The front LCD drive electrode faces a viewer 8. A backlighting device in the form of an OLED element 10 is arranged behind the ETN-LCD element 2 from the direction of the viewer 8. The OLED element 10 comprises front and back OLED drive electrodes 12 and 14. The back, i.e. the outer, OLED drive electrode 14 is formed such that it is diffusely reflective, so that light generated in the OLED element 10 is guided either directly or after reflection at the back OLED drive electrode 14 towards the front through the ETN-LCD element 2 in the direction of the viewer—arrow 20. The front OLED drive electrode 12 is light-transmissive in this case. Ambient light 22 incident on the liquid crystal display from the front penetrates through the ETN-LCD element 2 and, at the diffusely reflective back OLED drive electrode, is guided towards the front again in the direction of the viewer 8.

As an alternative or in addition, the front OLED drive electrode 12 may be formed in transflective fashion. In other words, light 22 penetrating through the ETN-LCD element from the direction of the viewer 8 is reflected from the transflective front OLED drive electrode 12 in the direction of the viewer 8 again, while light 20 from the OLED element 10 is transmitted through the front OLED drive electrode 12.

An air gap 16 is provided between the ETN-LCD element 2 and the OLED element 10, an enhancement film 18 being arranged in said air gap in a manner known per se.

Figure 2:
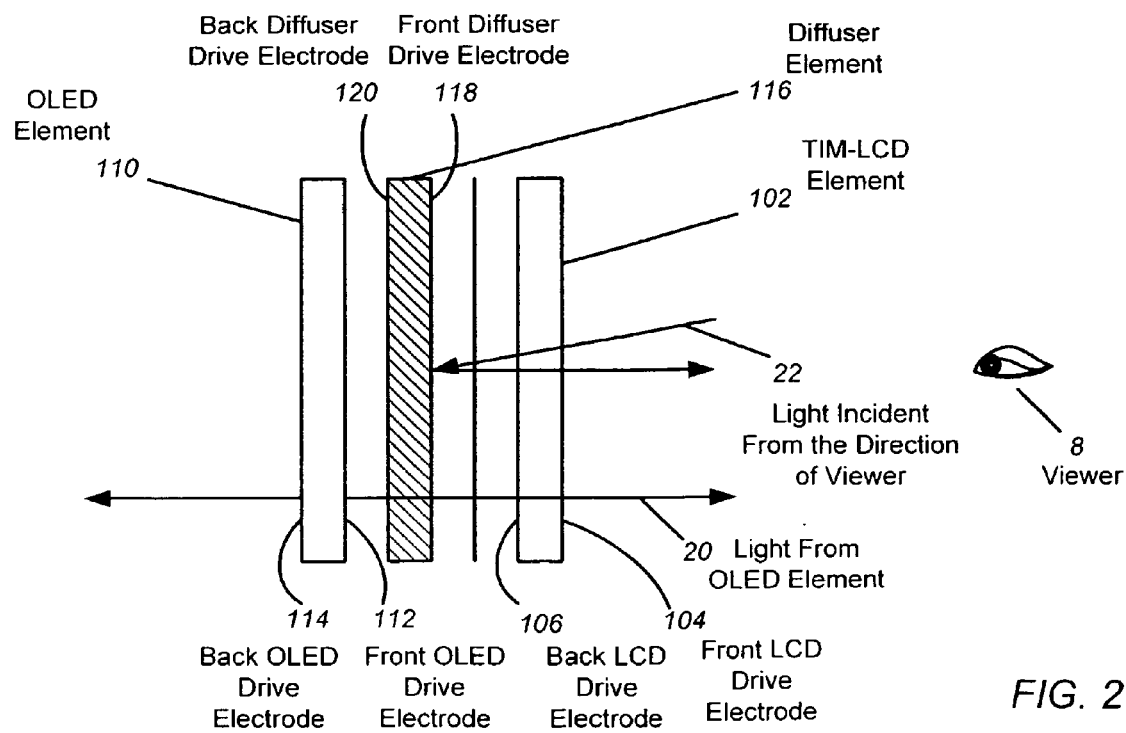
FIG. 2 shows a first embodiment of the invention.

FIG. 2 shows a first embodiment of the invention with a TIM-LCD element 102 comprising front and back LCD drive electrodes 104 and 106. The TIM-LCD element 102 (TIM=Transparent Imaging Matrix) is clearly transparent in the off state and black in the on state. The backlighting device in the form of an OLED element 110 is arranged behind the LCD element 102 from the direction of the viewer 8. The OLED element 110 comprises front and back OLED drive electrodes 112 and 114. Both OLED drive electrodes 114 and 116 and also the two LCD drive electrodes 104 and 106 are formed in transparent fashion.

A switchable diffuser element 116 in the form of a PDLC or EASL element is provided in the air gap 16 between OLED element 110 and LCD element 102. PDLC elements (PDLC=Polymer Dispersed Liquid Crystal) were developed by Kent State University and are used in particular as window areas that can be switched between clearly transparent and milky translucent. The PDLC element is usually clearly transparent in the off state and milky translucent in the on state.

A comparable function is also afforded by an EASL element as diffuser element 116. An EASL element is an electrically addressable smectic liquid crystal which can likewise be changed over between a clearly transparent state and a milky translucent state. In this case, the respective switching state remains after switching without voltage, that is to say that an EASL element is bistable.

PDLC elements suitable for the present invention are sold for example by the applicant itself and suitable EASL elements are sold by the company Polydisplay from Norway.

For changeover between the two states, front and back diffuser drive electrodes 118 and 120 are present on the front and rear sides of the diffuser element 116. At least one of the two diffuser drive electrodes 118, 120 is formed in transflective fashion. As a result of this, light 22 which is incident from the direction of the viewer 8 and impinges on a driven diffuser electrode 118, 120 is reflected from the latter through the TIM-LCD element back in the direction of the viewer 8. If the light 22 incident from the front impinges on a non-driven diffuser electrode 118, 120, the incident light 22 penetrates through the diffuser element 116 and the OLED element 110 situated behind the latter, that is to say that the liquid crystal display appears clearly transparent.

If the diffuser drive electrodes 118, 120 have only a whole-area segment, it is thereby possible only for the entire diffuser element 116 to be changed over between the two states on and off or milky translucent and clearly transparent. If the diffuser drive electrodes 118, 120 are segmented or pixellated, a pattern, e.g. a logo or a type of watermark, can also be represented in the diffuser element 116.

The entire liquid crystal display in accordance with the first embodiment according to FIG. 2 can thus be used for window facades on which information is intended to be represented in addition to the window function. By switching the diffuser element 116 on and off, it is possible, with OLED element 110 switched on, to realize a transflective night operating mode—diffuser element 116 switched on—or a transmissive night operating mode—diffuser element 116 switched off. In operation during the day, the diffuser element 116 is switched on or off as desired.

Figure 3:
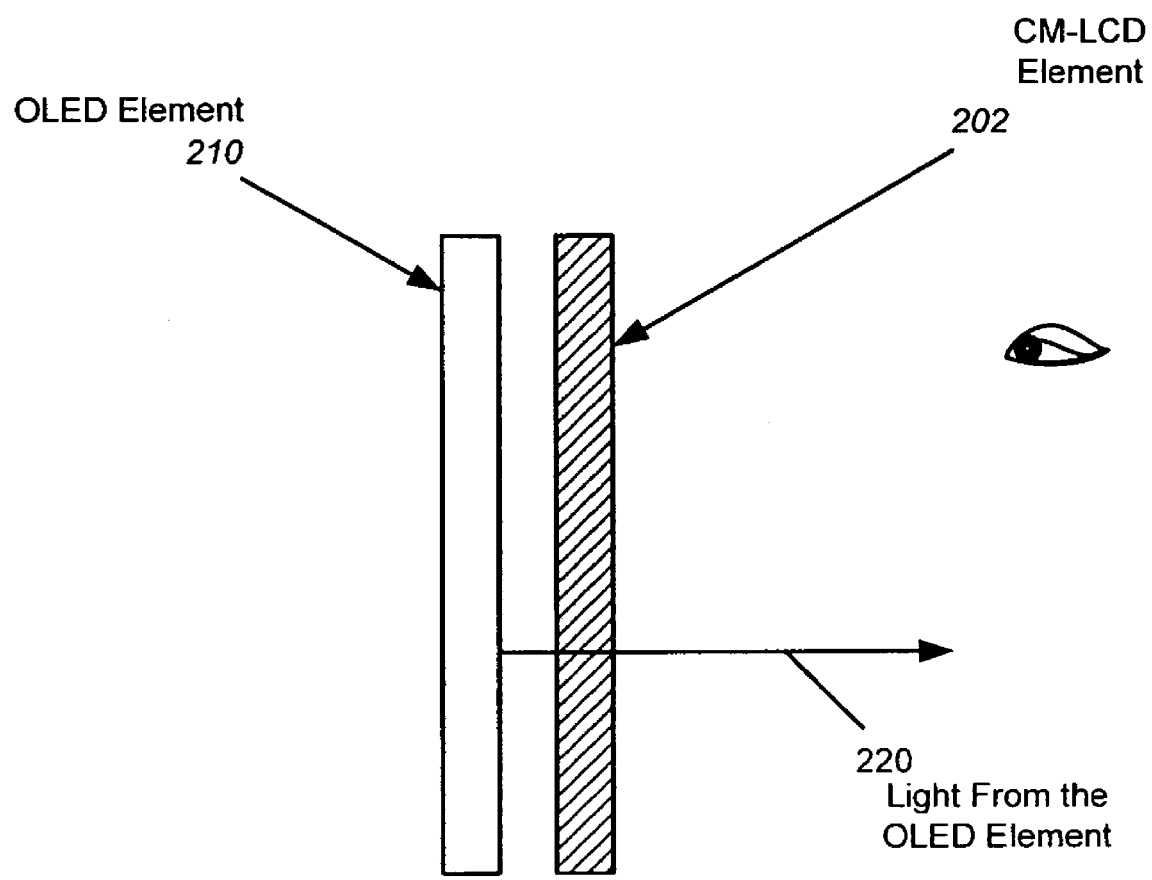
FIG. 3 shows a second embodiment of the invention.
Figure 5:
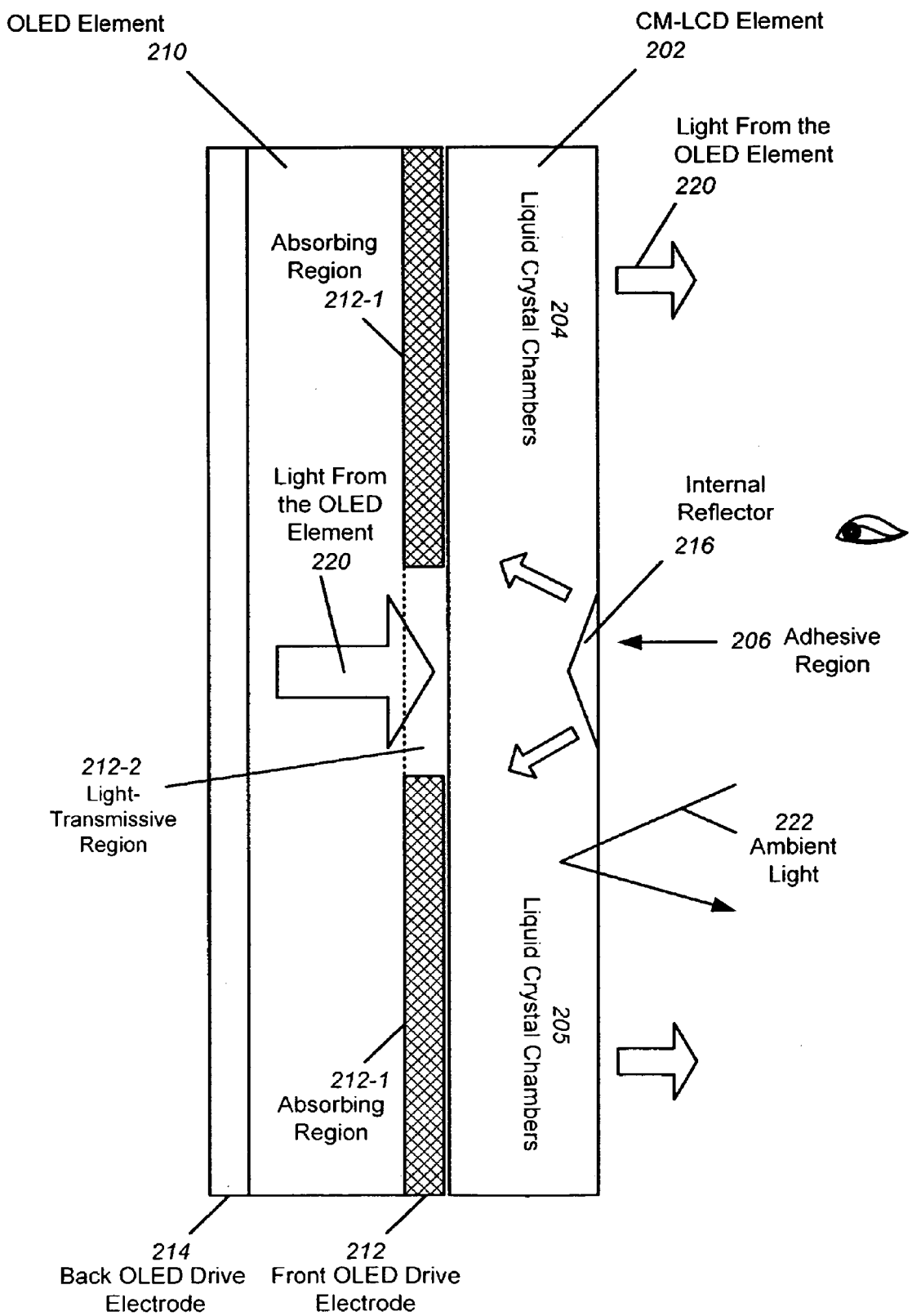
FIG. 5 shows a further detail of the LCD element of the second embodiment.

FIGS. 3 and 5 show a second embodiment of the invention with a CM-LCD element 202 and backlighting device in the form of an OLED element 210. The OLED element 210 comprises front and back OLED drive electrodes 212, 214.

Figure 4:
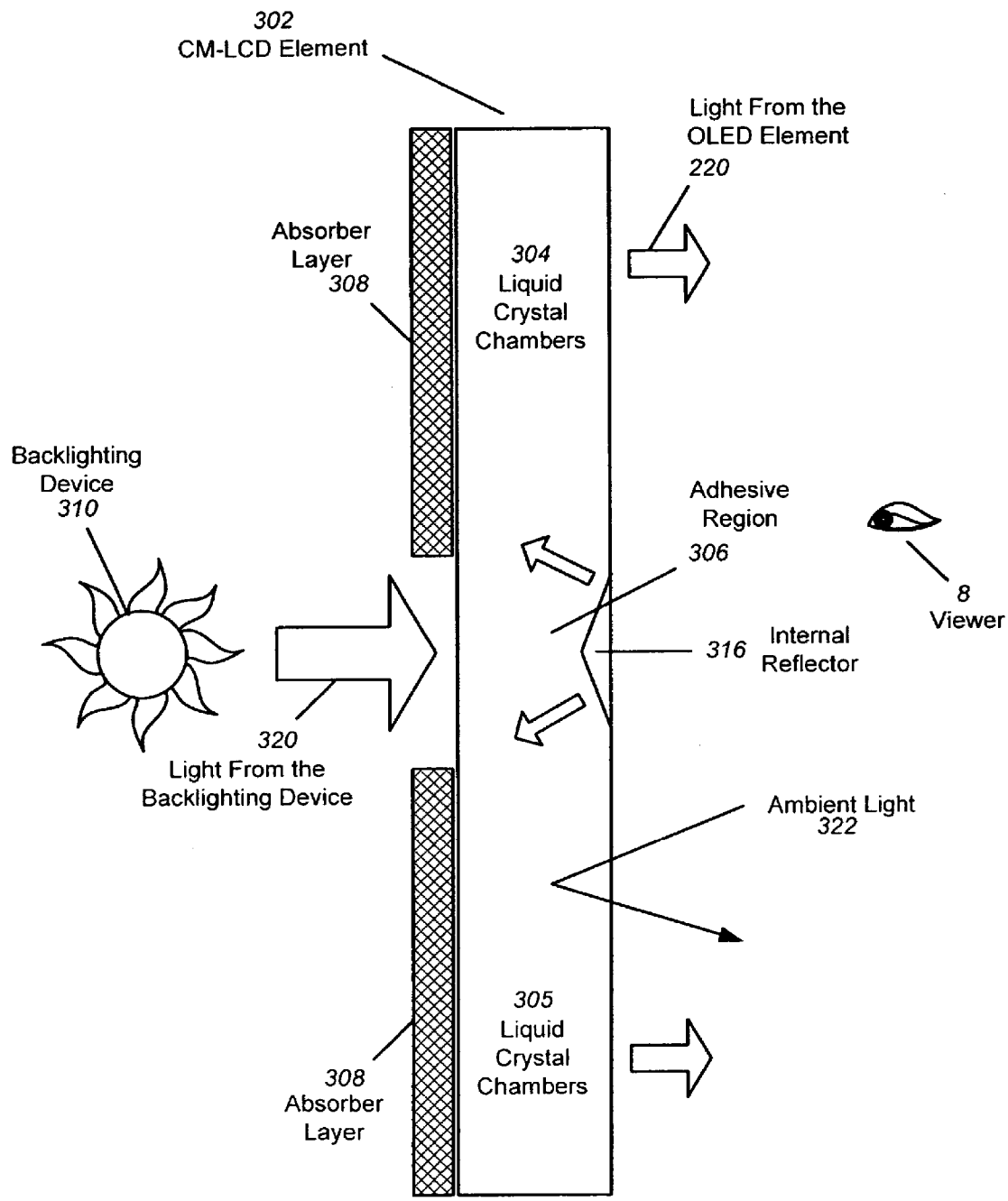
FIG. 4 shows the CM LCD element of the second embodiment.

FIG. 4 shows the basic construction of a CM-LCD element 302. A plurality of liquid crystal pixel elements or liquid crystal chambers 304, 305 are arranged in a one or two-dimensional matrix. Situated between the individual liquid crystal chambers 304, 305 is an adhesive region interconnecting the individual liquid crystal chambers 304, 305. The adhesive region 306 is not an active display area. A light-absorbing layer or an absorber layer 308 is provided on the rear side of the CM-LCD element 302 as seen from the viewer 8, but said layer does not extend over the adhesive region 306. A backlighting device 310 is provided behind the absorber layer 308. An internal reflector 316 is arranged in the adhesive region 306 at the front side of the CM-LCD element 302.

Light 320 from the backlighting device 310 penetrates into the adhesive region 306 from behind and is laterally reflected into the adjacent liquid crystal chambers 304, 305 by the internal reflector 316. Depending on whether or not the respective cholesteric liquid crystal is driven by means of drive electrodes (not illustrated), the light 320 from the backlighting device 310 is absorbed in the absorber layer 308—dark state of the CM-LCD element 310—or reflected towards the front in the direction of the viewer 8—bright state of the CM-LCD element 310. The beam path for the illumination of the CM-LCD element 302 from the front with ambient light 322 is the same here as in the case of illumination from behind with internal reflection of the light at internal reflectors 316.

The CM-LCD element 202 according to the second embodiment of the invention differs from the known CM-LCD element 302 according to FIG. 4 only by the fact that the function of the absorber layer 308 in FIG. 4 is concomitantly performed by the front OLED drive electrode 212. The front OLED drive electrode 212 therefore has a first light-absorbing region 212-1 behind the liquid crystal chambers 204, 205 and a second light-transmissive region 212-2 behind the adhesive region 206. A separate absorber layer is therefore unnecessary. The remaining components of the CM-LCD element 202 correspond to the components of the known CM-LCD element 302 according to FIG. 4, so that a further explanation thereof is omitted.

Instead of the internal reflector 216, it is also possible to use or provide scattering elements that scatters the light from the OLED element 210 diffusely into the liquid crystal chambers 204, 205.

In the embodiment according to FIGS. 3 and 5, the light 220 from the OLED element 210 is coupled in in the region of the adhesive edge or region 206 between two liquid crystal chambers 204, 205. As an alternative, it is also possible to couple in the light from the OLED element 210 via other regions that are not active display regions.

By virtue of the construction in accordance with the second embodiment, a very small structural height results and the backlighting device in the form of the OLED element 210 becomes an integral part of the liquid crystal display. In addition, a transflector or reflector behind the LCD element 202 is obviated since these functions are concomitantly performed by the OLED element 210.

The invention claimed is:

1. A liquid crystal display comprising:
    an LCD element for displaying information, comprising front and back LCD drive electrodes between which a liquid crystal is embedded,
    a backlighting device for illuminating the LCD element from behind,
    said backlighting device comprises a layered OLED element with a front OLED drive electrode facing the LCD element and with a back OLED drive electrode facing away from the LCD element and with OLED material in between the front and back OLED drive electrodes, and
    a diffuser element arranged between said OLED element and said LCD element,
    wherein said diffuser element is switchable between a transparent state and a diffuse state, and wherein
    the front and back LCD drive electrodes and the front and back OLED drive electrodes are formed in transparent fashion.

2. A liquid crystal display comprising:

an LCD element for displaying information, comprising front and back LCD drive electrodes between which a liquid crystal is embedded, a backlighting device for illuminating the LCD element from behind, said backlighting device comprises a layered OLED element with a front OLED drive electrode facing the LCD element and with a back OLED drive electrode facing away from the LCD element and with OLED material in between the front and back OLED drive electrodes, and a diffuser element arranged between said OLED element and said LCD element, wherein said diffuser element is switchable between a transparent state and a diffuse state, and wherein the front and back LCD drive electrodes and the back OLED drive electrode are formed in transparent fashion, while said front OLED drive electrode is light-transmissive in the area of said internal reflectors or in the area of said scattering elements and light-absorbing elsewhere.

3. A liquid crystal display comprising:

an LCD element for displaying information, comprising front and back LCD drive electrodes between which a liquid crystal is embedded, a backlighting device for illuminating the LCD element from behind, said backlighting device comprises a layered OLED element with a front OLED drive electrode facing the LCD element and with back OLED drive electrode facing away from the LCD element and with OLED material in between the front and back OLED drive electrodes, and a diffuser element arranged between said OLED element and said LCD element, wherein said diffuser element is switchable between a transparent state and a diffuse state, and wherein the front and back LCD drive electrodes and the back OLED drive electrode are formed in transparent fashion, while said front OLED drive electrode is light-transmissive and is only provided in the area of said internal reflectors or in the area of said scattering elements.

4. A liquid crystal display according to claim 3, wherein said back OLED drive electrode is only provided in the area of said internal reflectors or in the area of said scattering elements.

5. A liquid crystal display according to claim 1, 2, or 3, wherein said LCD element is a cholesteric multistable LCD element.

6. A liquid crystal display according to claim 1, 2, or 3, wherein at least said front OLED electrode is formed in multipartite fashion.

7. A liquid crystal display according to claim 1, 2, or 3, wherein said layered OLED element covers at least the active display area of said LCD element.

8. A liquid crystal display according to claim 1, 2, or 3, wherein at least one enhancement film is arranged between said OLED element and said LCD element.

9. A liquid crystal display according to claim 1, 2, or 3, wherein said LCD element is transparent or non-transparent in the switched-off state.

10. A liquid crystal display according to claim 1, 2, or 3, wherein said OLED element is capable of displaying a specific pattern.

11. A liquid crystal display according to claim 1, 2, or 3, wherein said diffuser element is capable of displaying a specific pattern.

12. A liquid crystal display according to claim 1, 2, or 3, wherein said switchable diffuser element is a PDLC element or an EASL element.

13. A liquid crystal display according to claim 1, 2, or 3, wherein said back OLED drive electrode is light-absorbing.

* * * * *